United States Patent [19]

Nelson

[11] 4,396,333

[45] Aug. 2, 1983

[54] CONTAINER EXCHANGES BETWEEN VESSELS

[76] Inventor: Arthur J. Nelson, 4191 George Ave., Apt. 4, San Mateo, Calif. 94403

[21] Appl. No.: 266,838

[22] Filed: May 26, 1981

[51] Int. Cl.³ .............................................. B65G 67/58

[52] U.S. Cl. .................................... 414/138; 254/900; 294/81 SF

[58] Field of Search ........................ 414/138, 139, 626; 294/67 R, 67 DA, 81 R, 81 SF; 254/900; 212/190

[56] References Cited

U.S. PATENT DOCUMENTS

| | | | |
|---|---|---|---|
| 3,428,194 | 2/1969 | Weiss | 294/67 R |
| 3,734,308 | 5/1973 | Pasternack | 294/81 SF |
| 3,753,552 | 8/1973 | Barron | 254/900 X |
| 3,897,098 | 7/1975 | Haertig | 294/81 SF |
| 4,074,818 | 2/1978 | Ray | 414/138 |

FOREIGN PATENT DOCUMENTS

| | | | |
|---|---|---|---|
| 7811592 | 5/1980 | Netherlands | 294/81 R |

*Primary Examiner*—Leslie J. Paperner

[57] ABSTRACT

A system to effect the exchange of containers by a floating crane between vessels changing draft respective the loading change of each. A means facilitates the spotting of the crane hoisting apparatus which includes an automatic locking arrangement engaging a container to the hoisting apparatus.

2 Claims, 9 Drawing Figures

36
14
19
10
31
30
17
16
29
28
22
24
15
63
48
47
25
52
21
13
53
27
26
20
49
11

69
70
71
77
74
87
85
90
93
72
81
81
92
86
87
83
78
80
73
88
79
79
76
67
82
67
91
66
65
51
64

52
81
65
65
52
81
52
51

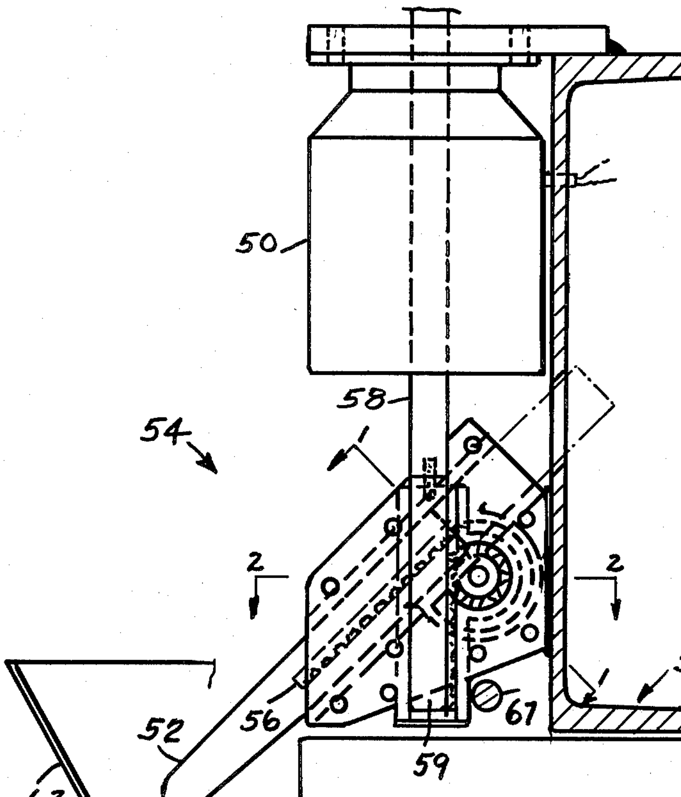
Fig 4
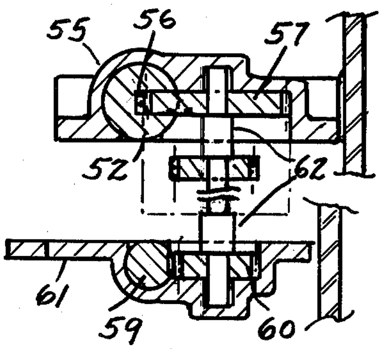
Fig 5
Fig 6
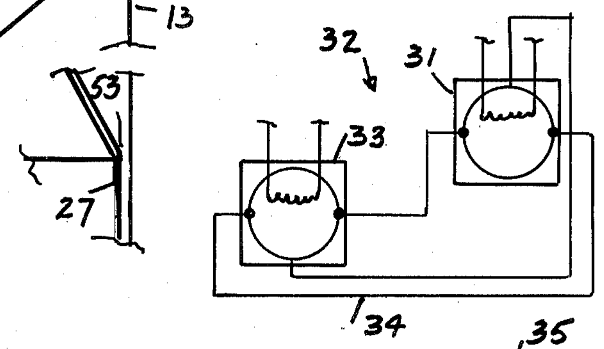
Fig 7
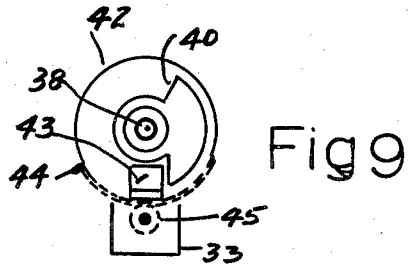
Fig 9
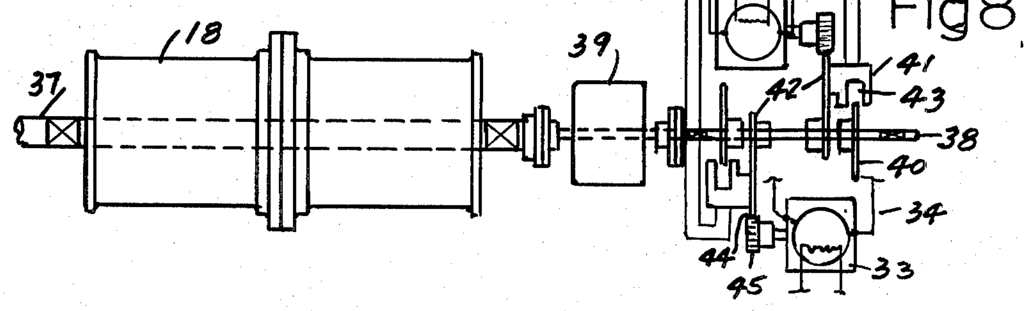
Fig 8

CONTAINER EXCHANGES BETWEEN VESSELS

DESCRIPTION OF FIGURES

FIG. 4 Vertical arrangement to spot one body above another.

FIG. 5 Rack and pinion gear assembly View 1—1 of FIG. 4.

FIG. 6 Rack and pinion gear assembly View 2—2 of FIG. 4.

FIG. 7 Partial wiring diagram for a selsyn system.

FIG. 8 Vane operated limit switch adjustment for a hoisting system.

FIG. 9 End view of switch in FIG. 8.

AS APPLIES TO CONTAINER EXCHANGES BETWEEN VESSELS

CONTAINERSHIP ACCOMMODATIONS

Figures 1, 2, 3:
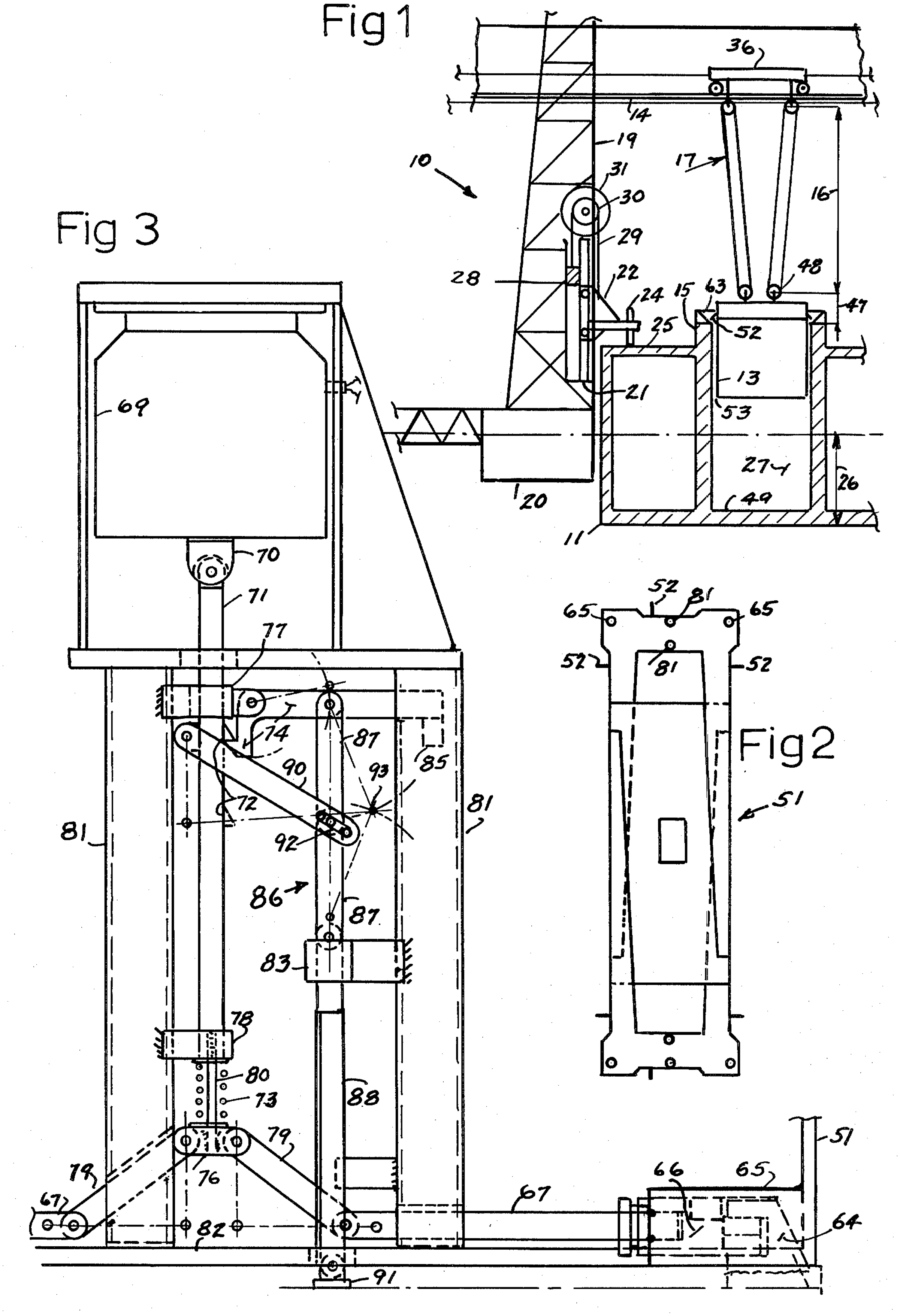
FIG. 1 Portional view in elevation of the crane and a ship.
FIG. 2 Outline of the spreader in plan view.
FIG. 3 Vertical arrangement to lock together two bodies.

In the general arrangement to exchange containers between ships, certain operations are detailed, as patentable features, to reveal simple and effective assemblies, developed electro-mechanical, to exclusion of fluid systems, for the following objects:

Govern the hoisting system to respond with change and difference in draft of two vessels with the craneway between.

Provide an arrangement to simplify spotting of one body over another.

Provide more latitude towards control of sway of bodies to be lowered in a cell.

Provide an automatically engaged and positive locking arrangement joining two bodies together.

The present invention relates to a floating container crane 10 operated between two container ships 11 (12 not shown) to exchange containers 13 from one ship to the other as controlled by a mooring system developed in my Disclosure Document No. 084 124 dated Sept. 10, 1979.

Governing Means (FIG. 1)

While tidal differences are inconsequential to the operation, draft differences, with progressive changes in the load borne by a vessel, alter the elevation between the craneway 14 above to the hatch coaming 15 of vessels. This variation in elevation is indexed by the span 16 between head and tail blocks of the wire rope hoisting system 17, thus measured by the different number of turns of drum 18 (FIG. 8) to which the wire is wound on one row. FIG. 1 diagrams this arrangement.

Of the four towers 19 supporting the craneway 14 above the floating crane hull 20, a port and starboard tower bears a vertical track 21 to contain a mobil detector 22 having a protruding bracket extending a wheel 24 for bearing on the deck 25 of ship 11. As draft 26 change so does detector 22 move up and down. As the crane 10 moves fore and aft to work different cells 27 so is the detector free wheeling with bearing on the deck 25.

The weight of detector 22 is principally supported by a counterweight 28 with interconnecting chain 29 suspending from sprocket 30 mounted on the shaft of selsyn transmitter 31 fastened above vertical track 21 on tower 19 as represented in FIG. 1 for ship 11. An identical arrangement as shown for ship 11 is provided to monitor draft changes of ship 12 (not shown with description of like apparatus for ship 12 understood).

In FIG. 7, the diagram, representing duplicate assemblies 32, illustrates selsyn transmitter 31 electrically wired to selsyn receiver 33 with turn of respective shafts specifically related.

In FIG. 8, the common shaft 37 of four like drums 18 bearing wires of the hoisting system 17, is coupled to a bearing supported extended shaft 38 by a gear unit 39 reducing total turns of drum 18 to one turn of shaft 38. A driven hub on shaft 38 bears a disk segment to be a vane 40 used to activate vane operated limit switch 41 (G.E. Co. Cat. #CR 115A). A hub with bearing clearance to shaft 38 bears a disk 42 to which is mounted switch 41. Said two hubs are located axially on shaft 38 to center vane 40 with gap 43 on vane switch 41. A portion of the periphery of disk 42 is machined with gear teeth 44 meshing pinion gear 45 mounted on the shaft of selsyn receiver 38.

In FIG. 8, the duplicate selsyn receiver and appurtenances are shown is necessary to complete the electric circuitry monitoring the bank of solenoids 50 (subsequently disclosed). The numbered parts identified are taken as sufficient for the apparent likeness of kind and purposes. A preliminary adjustment of apparatus will establish the basis from which subsequent adjustments become automatic.

A determination (subsequently discussed) of elevation 47, of tail block 48 above hatch coaming 15 of both ships 11–12, will establish the vane 40 imminent position towards entry in gap 43. As the system 17 lowers a container 13, vane switch 41 is open (inactive) until tail block 48 reaches elevation 47. Meanwhile detector 22 monitors elevation of hatch coaming 14 for transmitter 31 or 32 to turn receiver 33 to adjust the position of vane switch 41. With entry of vane 40 in switch 41, tail block 48 is below elevation 47. Switch 41 remains activated until tail block is returned above elevation 47. The arc length of vane 40 serves in the gap 43 to provide for a like elevation 47 of tail block 48 above cell floor 49.

The significance of switch 41 has to do with the powering of solenoid 50 made active only with tail blocks 48 below elevation 47. Thus in transferring containers between ships solenoids 50 are inactive approximately half the time of a cycle to exchange containers between ships.

Spotting Means (FIG. 4)

A spreader 51 provides for the semi-automatic and remote control of the engagement means of a container to the hoisting system 17. While sway of the suspended hoisting system is dampened in the arrangement of block and tackle, the need remains to spot position the spreader over a container to match fit corner castings 64 on top of the container with related fixtures 65 on the spreader per FIG. 3.

FIG. 4 is an elevational view of the spreader showing the portion developing the mechanism 54 to spot position the spreader with a container. As in FIG. 2 six locations of mechanism 54 provide for squareness of the two bodies (spreader 51 and container 13).

In FIG. 4 retractable appendage 52 extends angularly downward substantially below the top of container 13 and outwardly from the container so that appendage 52 must be retracted within confines established by the cell providing limited clearance 53 for the said two bodies 13, 51 to lower in the cell. The mechanism 54 working appendage 52 in housing 55 is a rack 56 and pinion gear 57 of FIG. 5.

Solenoid 50 mounted to the spreader is used to pull on a plunger 58 screw connected to rack 59 meshing with pinion gear 60 contained in housing 61 of FIG. 6. The two pinion gears 57, 60 are fixed to one shaft 62 as shown in exploded view FIG. 5, 6 with the two housings bolted together as arranged in FIG. 4.

Electric leads off the 6 (or more if needed) solenoids are manifolded with leads to vane switch 41. When tail blocks 48 are at elevation 47, switch 41 closes the circuit to solenoids 50 to pull the plunger thus turn pinion shaft 62 thus retract appendage 52 clear of cell 27. When tail block 48 is above elevation 47 the switch is opened, solenoid 50 is deactivated and plunger 58, rack 59 and appendage 52 lower by gravity to extended positions. Plunger 58 bears a weight (not shown) to increase gravity force.

Housing 55 is welded to spreader 51 to provide a substantial mounting of appendage 52 subject to forces imposed to top the spreader with the container. Housing 61 is bolted to fixed housing 55 to provide for assembly of the mechanism 54 and accommodate eventual replacement of wearing members.

Cell Entry Means (FIGS. 1, 4)

While means are provided associated with trolley 36 to spot a container over a cell, certain sway exists which is contained by hopper 63 adapted to be placed on hatch coamings 15 to outline the cell opening to be worked. Pendants (not shown) released from pockets in the spreader, connect to hopper 63 to be moved from cell to cell. The common practice to flare cell guides to ease entrance of containers is voided with the more effective hopper 63.

Pendants are used with the spreader to remove and replace hatch covers. Nylon lines shackled with hoppers and hatch covers extend to provide purchase at hatch coamings to control spotting by labor controlling container exchanges at terminals.

Engagement Means Between Two Bodies (FIG. 3)

A container's four top corner castings 64 have formed exterior surfaces, facing towards the container's perimeter, outlining what amounts to the base segment of an enlarged cone for the gradually acquired exact fit with the spreader 51 resting on the container 13.

The related spreader corner casting 65 mating with casting 64 includes a bolt 66 arranged to slide to and from a hole in casting 64, as the lock connecting said two bodies when the container is to be lifted. Bolts 66 are oriented for coaxial alignment as pairs at ends of spreader 51 for manipulation by a solenoid activating single stroke double acting toggle joint.

The two bodies are automatically locked together with the final fractional inch descent of spreader 51 to container 13 transpiring quicker than a trigger released mechanism can set the bolts. The bolting together mechanism can be remotely released only when electric circuits to the trolley and hoisting system are open. A green lighted signal is activated when said two bodies are properly connected for lifting a container.

The toggle joint is comprised of two links 79 connecting rods 67 (as extensions of bolts 66) to clevis 76. Plunger 70 of solenoid 69 is pin connected to vertical rod 71. Rod 71 is adjustably lengthened by stud bolt 80 to contain the compressed height of spring 73 between bearing 78 and clevis 76 in elevated and cocked position.

Two pipe columns 81 extend support from base 82 of the spreader body 51 to intermediate bearings and the housing for mounting solenoid 69. Bearings 75, 77, 78 and 83 establish a coplanar arrangement of supported members with columns 81. Bearing 78 provides backing for spring 73 made larger with clearance to pass rod 71. Bearing 77 provides lugs to which lever 74 pivots to release trigger 72 fixed to rod 71. FIG. 3 shows the assembly cocked by the solenoid having pulled on plunger 70 which by linkage draws bolt 66 clear of casting 64. With the plunger 70 seated the trigger is set to hold position against compressive force of the spring for an inactive solenoid.

A column assembly 86 suspending from lever 74 is comprised of two links 87 pin connected together and to rod 88 extended below the base 82 by a pivotal shoe 91. Rod 88 is supported by bearing 83 and guide 84 accommodating the split of column 88 rigged to clear link 79. Suspended length of column 86 below base 82 equals said final fractional inch descent. When said two bodies meet, column 86 will have been displaced upwardly to react with lever 74 and release trigger 72. Gravity and spring release at maximum force acts on the toggle weakest advantage. With the motion of the bolt 66 nearly set and the spring force weakest the toggle effect is a maximum.

When disengaging the locking bolt, the solenoid and toggle are both most effective. Link 90 becomes effective to recock the activating mechanism. Slot 92 in link 90 engages with pin connection of links 87. Triangulation of link 90 between columns 71 and 86 changes as rod 71 is released to cause links 87 to break their aligned position. As a result lever 74 is free to return and rest in slot 93 with the end weighted 85. Cam action of trigger 72 with lever 74 eases the engagement as rod 71 is pulled up.

Note in FIG. 4 the location of rod 67 extending along the width of the spreader in a space clear of mechanism 54. Members in FIG. 3 have been shown for convenience to be a coplanar arrangement. Columns 81 and 86 may be arranged in another coplanar angular location to the coplanar assembly of rods 67 and 71 as indicated in FIG. 2.

What is claimed is:

1. In a system to transfer containers between vessels comprising:

(a) a terminal having a floating crane selectively positioned along a straight course between established limits;

(b) said floating crane, having a craneway disposed by towers above a catamaran type hull, accommodates the disposition of a trolley bearing a container for out-reaches to athwartship cells of vessels;

(c) said hull, having a range of displacements, may provide varied buoyant support by the pontoon formed catamaran hull;

(d) an arrangement of piling disposes a vessel to each side of hull;

(e) said vessels have uniform cell accommodations with a selected cell of each vessel disposed beneath said craneway;

(f) a hoist system, extending between said out-reaches, accommodates a selected elevation of a spreader frame held as a pendant with said disposition of the trolley; an improved arrangement to content with the spotting above and engagement together of said spreader frame and a container as two bodies being one, comprising:

(1) spotting means suitably arranged around the spreader frame, as protruding angularly beneath and retractable appendages, negate the sway tending pendant like body with lowering by the hoist system to an initial contact between common corner match-fit fixtures and castings for said engagement;

(2) locking means cocked to be set measurably after seating of said engagement depends upon the trigger release of a compression spring acting on a double acting toggle joint to force bolts home to lock said bodies together;

(3) retracting means for said appendanges includes a rack and pinion train to multiply the force of a solenoid powering the appendages assembly; and, (4) cocking means for said bolt depends on a solenoid to activate the said toggle joint as arranged to be most powerful when needed to overcome inertia and friction resisting forces.

2. As in claim 1, an improved arrangement to content with the exchange of containers between vessels which may vary elevationally between vessels with change in loading of vessels while timing the use of said appendages, comprising:

(a) said hoisting system, depending on a single row wrap of wires on drums being powered to raise and lower said spreader frame, maintains a constant relationship between turns of said drums and the distance the spreader frame is below said craneway;

(b) detector means mobily mounted on said towers converts individual elevational changes of a vessel with said hull to rotary motion of a selsyn transmitter shaft;

(c) selsyn receiver means, establish the position of a vane operated limit switch to relate a hoist elevation above the respective vessel having varying draft, have shaft extensions fitted with pinion gears;

(d) extended shaft means, gear connected to shaft of said drums, make less than one full turn for the full elevational change of the spreader;

(e) said limit switches, made electrically active by a vane disposed in a gap formed in the switch body, depends on a vane extension of a hub fixed to said extended shaft and a disk fitted but with bearing clearance mounting around said extended shaft supporting said switch body for alignment of said gap with said vane;

(f) said disk, having its peripery formed as a gear, meshes with said pinion gear to locate the position of the switch body gap corresponding with the change of the vessel elevation respective said hull as transmitted by the selsyn system; and, (g) operating means to power the trolley and hoist system establishes a container position with said switch means timed to attend said spotting means as needed.

* * * * *